US 8,868,678 B2

(12) United States Patent
Hildreth et al.

(10) Patent No.: US 8,868,678 B2
(45) Date of Patent: Oct. 21, 2014

(54) ASPECTS OF DIGITAL MEDIA CONTENT DISTRIBUTION

(75) Inventors: Robert Hildreth, Bellevue, WA (US); Darren R. Davis, Woodinville, WA (US); Myron C. Thomas, New Castle, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 11/724,896

(22) Filed: Mar. 16, 2007

(65) Prior Publication Data

US 2007/0226365 A1 Sep. 27, 2007

Related U.S. Application Data

(63) Continuation-in-part of application No. 10/838,486, filed on May 3, 2004, now Pat. No. 7,676,590.

(51) Int. Cl.

| | |
|---|---|
| *G06F 15/16* | (2006.01) |
| *H04L 29/06* | (2006.01) |
| *G11B 27/034* | (2006.01) |
| *H04N 21/2343* | (2011.01) |
| *H04N 19/127* | (2014.01) |
| *H04N 19/40* | (2014.01) |

(52) U.S. Cl.
CPC ........ *H04L 29/06027* (2013.01); *G11B 27/034* (2013.01); *H04N 21/234309* (2013.01); *H04N 21/234336* (2013.01); *H04N 19/00103* (2013.01); *H04N 19/00472* (2013.01); *H04L 65/602* (2013.01)
USPC ........... 709/217; 709/246; 709/231; 709/247; 709/232; 715/500.1

(58) Field of Classification Search
CPC .................... H04N 19/00472; H04N 21/2335; H04N 21/234309
USPC ......................................................... 709/217
See application file for complete search history.

(56) References Cited

U.S. PATENT DOCUMENTS

| | | | |
|---|---|---|---|
| 5,596,420 | A | 1/1997 | Daum |
| 5,893,920 | A | 4/1999 | Shaheen et al. |

(Continued)

FOREIGN PATENT DOCUMENTS

| | | |
|---|---|---|
| CN | 1287665 A | 3/2001 |
| CN | 1393783 A | 1/2003 |

(Continued)

OTHER PUBLICATIONS

IP.com search.*

(Continued)

*Primary Examiner* — Arvin Eskandarnia
(74) *Attorney, Agent, or Firm* — Aaron Chatterjee; Andrew Sanders; Micky Minhas

(57) ABSTRACT

Techniques for distributing digital media content to personal electronic devices are discussed. Digital media content is collected from a variety of disparate digital media content sources. Specific digital media content is identified and transcoded into a selected format prior to receipt by a particular personal electronic device. The selected format may be based on preferences or characteristics of the personal electronic device or the user thereof, the network, or both. Virtually unlimited subset selection criteria may be used to arranged transcoded digital media content into subsets, which may be temporarily or permanently stored in a single computer or using distributed computing techniques. DRM and identity management techniques can be used in combination with the transcoding and distribution techniques discussed herein to accommodate many business models.

22 Claims, 9 Drawing Sheets

(56) References Cited

U.S. PATENT DOCUMENTS

| | | | |
|---|---|---|---|
| 5,987,126 A | 11/1999 | Okuyama et al. | |
| 6,052,735 A | 4/2000 | Ulrich et al. | |
| 6,189,146 B1 | 2/2001 | Misra et al. | |
| 6,219,652 B1 | 4/2001 | Carter et al. | |
| 6,311,058 B1 | 10/2001 | Wecker et al. | |
| 6,324,544 B1 | 11/2001 | Alam et al. | |
| 6,327,652 B1 | 12/2001 | England et al. | |
| 6,393,434 B1 | 5/2002 | Huang et al. | |
| 6,407,680 B1 | 6/2002 | Lai et al. | |
| 6,463,445 B1 | 10/2002 | Suzuki et al. | |
| 6,493,758 B1 | 12/2002 | McLain | |
| 6,535,238 B1 | 3/2003 | Kressin | |
| 6,542,546 B1 | 4/2003 | Vetro et al. | |
| 6,601,056 B1* | 7/2003 | Kagle et al. | 1/1 |
| 6,611,358 B1 | 8/2003 | Narayanaswamy | |
| 6,757,517 B2 | 6/2004 | Chang | |
| 6,772,340 B1 | 8/2004 | Peinado et al. | |
| 6,775,655 B1 | 8/2004 | Peinado et al. | |
| 6,959,348 B1 | 10/2005 | Chan et al. | |
| 6,970,915 B1 | 11/2005 | Partovi et al. | |
| 6,981,045 B1 | 12/2005 | Brooks | |
| 6,983,371 B1 | 1/2006 | Hurtado et al. | |
| 7,000,032 B2 | 2/2006 | Kloba et al. | |
| 7,039,643 B2 | 5/2006 | Sena et al. | |
| 7,054,335 B2 | 5/2006 | Wee et al. | |
| 7,054,964 B2 | 5/2006 | Chan et al. | |
| 7,089,309 B2 | 8/2006 | Ramaley et al. | |
| 7,111,058 B1 | 9/2006 | Nguyen et al. | |
| 7,120,873 B2 | 10/2006 | Li | |
| 7,133,925 B2 | 11/2006 | Mukherjee et al. | |
| 7,143,354 B2 | 11/2006 | Li et al. | |
| 7,155,475 B2 | 12/2006 | Agnoli et al. | |
| 7,200,680 B2 | 4/2007 | Evans et al. | |
| 7,203,620 B2 | 4/2007 | Li | |
| 7,278,165 B2 | 10/2007 | Molaro | |
| 7,290,699 B2 | 11/2007 | Reddy et al. | |
| 7,382,879 B1 | 6/2008 | Miller | |
| 7,421,024 B2 | 9/2008 | Castillo | |
| 7,433,546 B2 | 10/2008 | Marriott et al. | |
| 7,474,106 B2 | 1/2009 | Kanno | |
| 7,475,106 B2 | 1/2009 | Agnoli et al. | |
| 2001/0031066 A1 | 10/2001 | Meyer et al. | |
| 2001/0033619 A1 | 10/2001 | Hanamura et al. | |
| 2002/0070982 A1* | 6/2002 | Hill et al. | 345/835 |
| 2002/0078075 A1 | 6/2002 | Colson et al. | |
| 2002/0082939 A1 | 6/2002 | Clark et al. | |
| 2002/0103880 A1* | 8/2002 | Konetski et al. | 709/218 |
| 2002/0143972 A1* | 10/2002 | Christopoulos et al. | 709/231 |
| 2002/0161928 A1 | 10/2002 | Ndili | |
| 2002/0164018 A1 | 11/2002 | Wee et al. | |
| 2003/0028488 A1 | 2/2003 | Mohammed et al. | |
| 2003/0028643 A1 | 2/2003 | Jabri | |
| 2003/0065816 A1* | 4/2003 | Dharmadhikari et al. | 709/240 |
| 2003/0126608 A1 | 7/2003 | Safadi et al. | |
| 2003/0158913 A1 | 8/2003 | Agnoli et al. | |
| 2004/0038941 A1 | 2/2004 | Zhu et al. | |
| 2004/0078383 A1* | 4/2004 | Mercer et al. | 707/102 |
| 2004/0102339 A1 | 5/2004 | Aoyagi et al. | |
| 2004/0143652 A1 | 7/2004 | Grannan et al. | |
| 2004/0148344 A1* | 7/2004 | Navar et al. | 709/203 |
| 2004/0193648 A1 | 9/2004 | Lai et al. | |
| 2004/0196975 A1 | 10/2004 | Zhu et al. | |
| 2005/0074063 A1 | 4/2005 | Nair et al. | |
| 2005/0132264 A1* | 6/2005 | Joshi et al. | 715/500.1 |
| 2005/0154608 A1* | 7/2005 | Paulson et al. | 705/1 |
| 2005/0163223 A1* | 7/2005 | Klamer et al. | 375/240.25 |
| 2005/0177731 A1* | 8/2005 | Torres et al. | 713/182 |
| 2005/0229118 A1 | 10/2005 | Chiu et al. | |
| 2005/0239434 A1 | 10/2005 | Marlowe | |
| 2005/0283806 A1 | 12/2005 | Torvinen | |
| 2006/0008256 A1 | 1/2006 | Khedouri et al. | |
| 2006/0031387 A1 | 2/2006 | Hamzeh et al. | |
| 2006/0056336 A1 | 3/2006 | Dacosta | |
| 2006/0182357 A1* | 8/2006 | Liu et al. | 382/239 |
| 2006/0230169 A1 | 10/2006 | Kaplan et al. | |
| 2007/0058718 A1 | 3/2007 | Shen et al. | |
| 2007/0153910 A1 | 7/2007 | Levett | |
| 2007/0165144 A1* | 7/2007 | Bennett et al. | 348/734 |
| 2007/0204064 A1* | 8/2007 | Mail et al. | 709/246 |
| 2008/0005673 A1 | 1/2008 | Thane | |
| 2008/0126936 A1 | 5/2008 | Williams | |
| 2009/0138808 A1* | 5/2009 | Moromisato et al. | 715/758 |
| 2011/0070917 A1 | 3/2011 | Sung et al. | |
| 2012/0096339 A1 | 4/2012 | Cohen et al. | |

FOREIGN PATENT DOCUMENTS

| | | |
|---|---|---|
| EP | 1045388 | 10/2000 |
| EP | 1253740 | 10/2002 |
| EP | 1320973 A2 | 6/2003 |
| EP | 1338992 | 8/2003 |
| JP | 2003058660 | 2/2003 |
| JP | 2003330560 | 11/2003 |
| KR | 1020040098627 | 11/2004 |
| RU | 2144269 C1 | 1/2000 |
| RU | 2163056 C2 | 2/2001 |
| WO | WO02/28006 | 4/2002 |
| WO | WO 02/052730 | 7/2002 |
| WO | WO02088991 | 11/2002 |
| WO | WO03/034313 | 4/2003 |
| WO | WO03/058508 | 7/2003 |
| WO | WO2004008407 A1 | 1/2004 |
| WO | WO2004/102459 | 11/2004 |
| WO | WO2005010763 | 2/2005 |

OTHER PUBLICATIONS

Antonellis, et al., "Article Suggestion for Encyclopedia of Mobile Computing and Commerce", http://www.stanford.edu/~antonell/papers/Antonellis_Encyclopedia_CTT.pdf.

Antonellis, et al., "Content Transformation Techniques", http://ru6.cti.gr/ru6/publications/9717content_transform_camera_ready.pdf.

Antonellis, et al., "Game Based Learning for Mobile Users", http://www.stanford.edu/~antonell/papers/Antonellis_CGAIMS2005.pdf.

Ferrer, et al., "Streamobile: Pay-per- View Video Streaming to Mobile Devices Over the Internet", Date: 2002, http://ieeexplore.ieee.org/iel5/8104/22410/01045931.pdf?isNumber&htry=0.

Goose, et al., "Toward Improving the Mobile Experience with Proxy Transcoding and Virtual Composite Devices for a Scalable Bluetooth LAN Access Solution", http://www.scr.siemens.com/en/pdf/mt pdf/mdm2002.pdf.

Digital 5, "Media Server," printed Apr. 18, 2005, 2 pages.

DRM Watch Staff, "Microsoft Extends Windows Media DRM to Non-Windows Devices," DRM Watch, May 7, 2004, 2 pages.

Ihde, Steven C. et al., "Intermediary-based Transcoding Framework," printed Apr. 18, 2005, pp. 1-3.

Kassler et al., "Generic QOS Aware Media Stream Transcoding and Adaption," Dept. of Distributed Systems, University of Ulm, Germany, printed Apr. 18, 2005, 10 pages.

Lee, Yui-Wah et al., "Gamma" A Content-Adaption Server for Wireless Multimedia Applications, Bell Laboratories, Holmdel, NJ USA, printed Apr. 18, 2005, pp. 1-36.

LightSurf Technologies, "LightSurf Intelligent Media Optimization and Transcoding," printed Apr. 18, 2005, 1 page.

Singh; "PTC: Proxies that Transcode and Cache in Heterogeneous Web Client Environments"; Proceedings of the Third International Conference on Web Information Systems, 2002; pp. 11-20.

Huang, et al.; "A Frame-Based MPEG Characteristics Extraction Tool and Its Application in Video Transcoding"; IEEE Transaction on Consumer Electronics, Aug. 2002; vol. 48, No. 3; pp. 522-532.

Britton; "Transcoding: Extending e-business to new environments"; IBM Systems Journal, 2001; vol. 40, No. 1; pp. 153-178.

Chen, et al. "iMobile EE—an interprise mobile service platform"; Wireless Networks, 2003; vol. 9 No. 4; pp. 283-297.

Chandra et al.; "Application-Level Differentiated Multimedia Web Services Using Quality Aware Transcoding"; IEEE Journal on Selected Areas of Communications, Dec. 2000; vol. 18, No. 12; pp. 2544-2564.

(56) References Cited

OTHER PUBLICATIONS

Lee, et al.; "Data Synchronization Protocol in Mobile Computing Environment Using SyncML"; HSNMC 2002 5th IEEE International Conference on High Speed Networks and Multimedia Communications, 2002; pp. 133-137.

Nikkei Electronics; "Contents transcoding technology is now spotlighted as "lubricant" for online digital distribution"; vol. 775, 2000; pp. 57-62.

"Transcode" Online Nov. 29, 2002 retrieved from the internet: url:http://www.theorie.physik.unigoettingen.de/{ostreich/transcode/html/intro.html retried Aug. 19, 2004.

Bagwell, Chris; "SoX-Sound eXchange" Internet Dec. 12, 2003 retrieved from ulr:http://web.archive.org/web/20031212170807/http://sox.sourceforge.net retrieved on Aug. 16, 2004.

Britton et al.; "Transcoding: Extending e-business to new environments" Internet Nov. 6, 2002 Retrieved from URL:http://researchweb.watson.ibm.com/journal/sj/401/britton.html retrieved Aug. 19, 2004.

Chen et al.; "An adaptive Web Content Delivery System" Internet May 21, 2000 Retrieved from URL:http://research.microsoft.com/asia/dload_files/g-mcomputing/MediaCom2/v5.pdf.

Chi-Hung Chi Yang Cao; Pervasive Web Content Delivery with Efficient Data Reuse' Internet Aug. 1, 2002 retrieved from url: http//2002.iwcw.org/papers/18500120.pdf retrieved on Aug. 16, 2004.

D.L. Ripps; "The Multitasking Mindset Meets the Operating System" EDN Electrical Design News Cahners Publishing Co. Newton Massachusetts vol. 35, No. 20 Oct. 1, 1990.

Shaha et al.; "Multimedia Content Adaptation for QoS Management over Heterogeneous Networks" Internet May 11, 2001 retrieved Aug. 18, 2004.

Shen et al.; "Caching Strategies in Transcoding-enabled Proxy Systems for Streaming Media Distribution Networks" Internet Dec. 10, 2003 Retrieved from URL: http://www.hpl/hp.com/techreports/2003/HPL-2003-261.pdf retrieved on Aug. 19, 2004.

Zhijun Lei and Nicolas D. Goer; "Context-based media Adaptation in Pervasive Computing" Internet May 31, 2001 Retrieved from url: http://www.mcrlab.uottawa.ca/papers/Ryan_paper.pdf retrieved on Aug. 19, 2004.

European Office Action mailed Jan. 8, 2013 for European patent application No. 06738895.9, a counterpart foreign application of US patent No. 7,558,463, 5 pages.

Extended European Search Report mailed Sep. 16, 2011 for European patent application No. 06738895.9, 7 pages.

Heuer et al., "Adaptive Multimedia Messaging based on MPEG-7-The M3-Box", Proc. Secong Int'l Symposium on Mobile Multimedia Systems & Applications, Delfit, Nov. 9-10, 2000, pp. 6-13.

Tanslated Japanese Office Action mailed Sep. 2, 2011 for Japanese patent application No. 2008-507668, a counterpart foreign application of US patent No. 7,558,463, 6 pages.

Office action for U.S. Appl. No. 12/685,951, mailed on Jul. 6, 2012, Kiilerich, "Transcode Matrix", 17 pages.

European Office Action mailed Nov. 18, 2013 for European patent application No. 06738895.9, a counterpart foreign application of US patent No. 7,558,463, 4 pages.

Indian Office Action mailed Oct. 15, 2013 for Indian patent application No. 2744/DELNP/2005, a counterpart foreign application of US patent No. 7,676,590, 2 pages.

Translated Indian Office Action mailed Mar. 26, 2014 for Indian patent application No. 4562/CHENP/2007, a counterpart foreign application of U.S. Appl. No. 11/108,327, 2 pages.

\* cited by examiner

218

| Target Device A | Target Device B | Target Device C | Target Device D |
|---|---|---|---|
| | | | |
| | | | |
| | | | |
| | | | |

| Target Device A | | | | |
|---|---|---|---|---|
| Desired Media | Media In Media Library Yet? | Media On Target Device Yet? | Media Transcoded Yet? | Device Capabilities |
| Friends | ✓ | X | X | File Format(s), Bit Rate(s), Screen Resolution, |
| Cops | ✓ | X | X | |
| Simpsons | X | X | X | |
| • | • | • | • | • |
| • | • | • | • | • |

| Target Device A | | | | |
|---|---|---|---|---|
| Desired Media | Media In Media Library Yet? | Media On Target Device Yet? | Media Transcoded Yet? | Device Capabilities |
| Friends | ✓ | X | ✓ | File Format(s), Bit Rate(s), Screen Resolution, |
| Cops | ✓ | X | ✓ | |
| Simpsons | ✓ | X | ✓ | |
| • | • | • | • | • |
| • | • | • | • | • |

*Fig. 4*

218 —
| Target Device A |||||
|---|---|---|---|---|
| Desired Media | Media In Media Library Yet? | Media On Target Device Yet? | Media Transcoded Yet? | Device Capabilities |
| Friends | ✓ | ✓ | ✓ | File Format(s), Bit Rate(s), Screen Resolution, |
| Cops | ✓ | ✓ | ✓ | |
| Simpsons | ✓ | ✓ | ✓ | |
| • | • | • | • | • |
| • | • | • | • | • |
*Fig. 5*
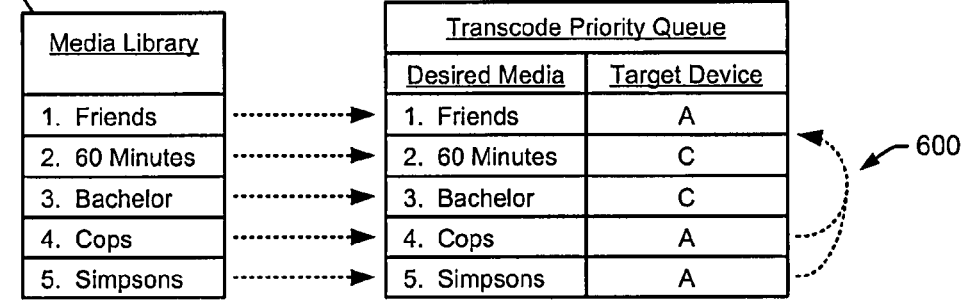
*Fig. 6*
*Fig. 7*
*Fig. 8*

ASPECTS OF DIGITAL MEDIA CONTENT DISTRIBUTION

STATEMENT OF RELATED APPLICATION

This application is a continuation-in-part of U.S. patent application Ser. No. 10/838,486, filed May 3, 2004, entitled "Background Transcoding," which is incorporated by reference herein.

BACKGROUND

As digital media technology continues to advance and the cost of storage continues to decline, users increasingly host and consume digital media on their own portable and non-portable computing devices, including but not limited to personal computers (for example, primary computers such as desktop or laptop personal computers), hand-held computers, mobile phones/smart phones, personal digital assistants, in-vehicle devices, and personal media rendering devices. Examples of such digital media include music, video, still pictures, and so on.

Such personal computing devices are often equipped to access one or more networks, and network access is virtually ubiquitous, providing users more access to information than ever. There is a growing need for applications that effectively transfer digital media from source devices, both user-controlled source devices and source devices that are controlled by other entities, to the personal computing devices via networks.

In the past, transcoding digital media has been done "on-the-fly", or at the time the digital media is being transferred from the source device. Transcoding typically includes altering a media file through one or more transcoding processes including, for example, converting the media file from one format to another so the file will play on the device, down-sampling the media file to a lower bit rate to reduce the amount of storage space needed on the device, or adapting the screen size of the file so video appears correctly on the device. One important reason for transcoding may be to convert a media file to a format having lower CPU requirements for decoding. On-the-fly transcoding of digital media generally occurs during synchronization of media content between a source device and a target device, at the time the devices are physically or virtually/logically connected together.

Although transcoding can be a time-consuming process, several factors have generally made the added time needed for on-the-fly transcoding during media transfers a reasonable inconvenience. For example, until recently, most portable media devices were audio-only devices supporting audio file formats such as MP3 and WMA. Transcoding (e.g., changing the bit rate and/or file format) a 3-minute song file while transferring it to a device adds only around 20 seconds to the transfer time. In addition, limited storage capability on a device limits the amount of media that can be transferred to the device, making the time required for transcoding less noticeable.

With portable media devices now able to hold gigabytes of content, however, in addition to more and more of these devices including video capability, the time required for transcoding media content while transferring it to a device can have a much greater adverse impact on the overall user experience. Transferring an increased amount of media content to fill a larger storage capacity on a newer device compounds the problem of the time-consuming transcode process noted above.

In addition, transcoding video content for devices that provide video playback can be much more time intensive than transcoding audio content, which is primarily what has been transcoded for most media devices in the past. As an example, desktop video can consume disk space at rates in excess of 1 GB per hour, and the complexity of the video encoding process causes video transcoding to generally take between ½ and 2× "real time" to complete. Therefore, performing all file transcoding tasks at the actual time that media files are being transferred to a device may no longer be acceptable.

While it may be possible to stream certain content from one device to another in real-time, this option is not always desirable in every situation from a user's perspective-real-time streaming has the potential to be unduly intrusive, disruptive, or distracting for use in a variety of venues. In addition, streaming to a networked portable device may be limited by the availability or type of network connection. For example, popular cellular telephone networking technologies are only available in large open spaces and frequently do not work well inside a building. Users may find that they prefer to transfer large collections of content when network connectivity is good rather than streaming a particular piece of content when desired.

Accordingly, a need exists for a way to reduce the time required for transferring digital media content when transferring the content between a source device and a target device, which may be utilized independent of where the target and source devices are located and whether or not such devices are controlled by the same entity.

SUMMARY

Techniques for distributing digital media content to personal electronic devices via networks are discussed herein. Digital media content is collected from a number of digital media content sources that may be controlled by disparate entities. Specific digital media content is identified and transcoded into a selected format prior to receipt by a particular personal electronic device via a network node. The selected format may be based on preferences or characteristics of the personal electronic device or user thereof, the network, or both. Communication between the personal electronic device and the network node may be peer-to-peer or client-server type communication.

Optionally, transcoded digital media content is arranged into subsets for distribution based on virtually unlimited subset selection criteria, such as user information, client-side or network-side operating environment characteristics or capabilities, business rules, temporal references, content-related information, and the like, which may be predetermined or determined dynamically. Subsets may be stored in a single computer or using distributed computing techniques, and may be stored in client-side or network-side electronic memories such as temporary memories (for example, cache memories) or permanent memories.

The use of digital rights and identity management techniques in combination with the media content transcoding and distribution techniques described herein accommodates a wide variety of business models that simultaneously support the often diverse interests of different digital media content sources such as individuals, advertisers, media content creators and suppliers, network operators, and licensors/licensees.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIGS. 3-5 illustrate exemplary tables in an exemplary transcode database.

FIG. 6 illustrates an exemplary media library and an exemplary table of an exemplary transcode database.

FIG. 7 illustrates an exemplary transcode timeline that shows a priority order of transcoding media files.

FIG. 8 illustrates an exemplary transcode timeline with an adjusted transcode priority.

DETAILED DESCRIPTION

Techniques for distributing pre-transcoded digital media content, which may be from a number of digital content sources and/or controlled by disparate entities, to target electronic devices via networks are discussed herein. Specific digital media content is identified and transcoded into a selected format prior to receipt by a particular target device via a communication session (such as a peer-to-peer communication session or a client-server communication session).

Because the rendering capabilities and network accessibility of target devices vary, the selected format is based on characteristics or preferences associated with the target device or user thereof, the network, or both. Examples of characteristics/preferences associated with a target device or user include but are not limited to device type, processing capabilities, device-related identification numbers (such as serial numbers, EINs, and the like), user-related identities for authentication and authorization purposes, display capabilities, network connectivity capabilities, destination address information, available memory, and user preferences or characteristics. Examples of characteristics/preferences associated with the network include but are not limited to network availability, network-related identities for authentication and authorization purposes, network streaming capability, network reliability, user network preferences, network latency, network bandwidth, network usage level, and network usage cost.

Generally, media content is transcoded, often in the background, on a source device, which is accessible via a network server or service. It is generally anticipated which media content to transcode based on user-input, rules, or virtually any other desired criteria. Distribution criteria, transcoded digital media content, and other information may be maintained in one or more information repositories, stored in a single computer or using distributed computing techniques in electronic memories such as temporary memories (for example, cache memories) or permanent memories.

The use of digital rights and identity management techniques in combination with the digital media content transcoding and distribution techniques are also described herein.

Figure 1:
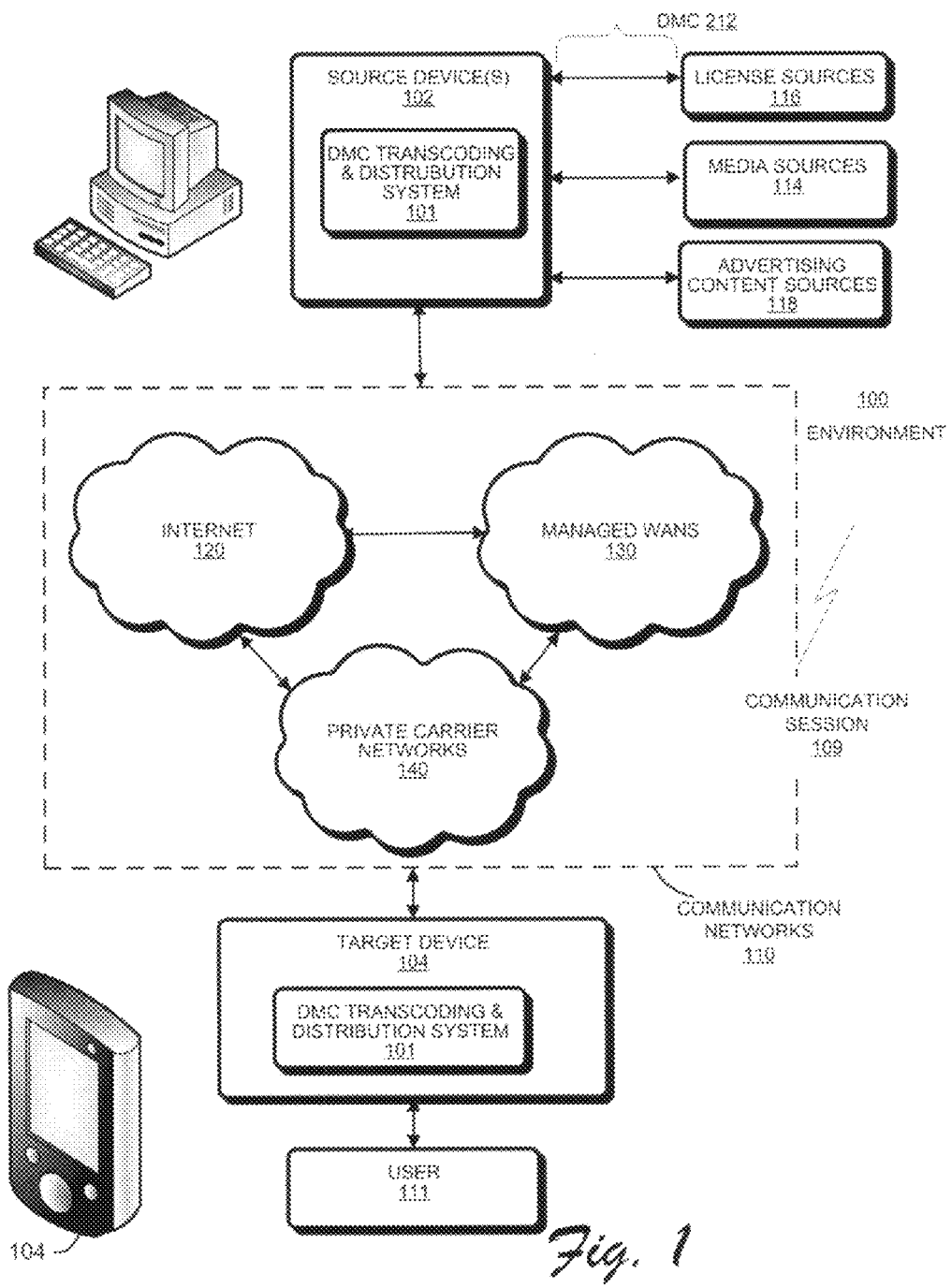
FIG. 1 illustrates an exemplary environment suitable for pre-transcoding media content in anticipation of transferring the media content to a target device.

Turning to the drawings, where like numerals designate like components, FIG. 1 is a simplified functional block diagram of an environment 100 via which digital media content 212 available from disparate sources is collected, organized, transcoded and distributed to target device 104 via networks 110 using digital media content transcoding and distribution system ("DMC TDS") 101. Aspects of DMC TDS may be hosted by various network-side entities or devices (such as one or more source devices 102) and/or target devices. Generally, digital media content 212 is at least in part pre-transcoded by source device(s) 102, prior to being received by target device(s) 104. Transcoding involves changing one or more aspects of the original representation of digital media content 212 to accommodate characteristics or preferences of user 111, target device 104, or communication network(s) 110.

Sources of digital media content 212 are any wireless or wired electronic devices or systems (or any physical or logical elements of such devices or systems), operated by commercial or non-commercial entities, which supply digital media content 212. As shown, digital media content 212 is received from license sources 116, digital media sources 114, and advertising content sources 118. Generally, content servers are separate from license servers, although licenses can generally be considered to be digital content. It will be appreciated that additional sources are possible. Sources 116, 114, 118 and other sources may use any now known or later developed formats, communication protocols or techniques to provide encoding and/or transport for digital media content 212.

License sources 116 represent technologies, techniques and/or systems responsible for implementing aspects of digital rights management ("DRM") schemes such as content encryption schemes, digital license distribution schemes, client-server authentication/authorization schemes, and key/ticket-based authentication/authorization schemes. One example of digital media content 212 supplied by license sources 116 is a digital license (not shown) used to protect the intellectual property rights of one or more media sources 114 (discussed further below).

Digital licenses are electronic items or techniques operative to grant one or more rights to an entity under one or more intellectual property rights protecting particular digital media content 212. Examples of grants under intellectual property rights include the rights granted under copyrights to use, reproduce, make derivative works of (e.g., transcode) or distribute a particular digital content item. Rights granted under intellectual property rights may also be restricted in various ways, for example, in accordance with business rules, which reflect intellectual property rights holders' preferences regarding how digital content items are distributed or used, to whom they are distributed, and when or where they are distributed or used. Examples of business rules include but are not limited to limits on the number of times a particular digital content item may be reproduced, transcoded, rendered, or distributed, or the type of rendering device that may be used to render the digital content item (it may often be necessary to re-encode digital content items for use on different rendering devices, and certain business rules may restrict re-coding events). Business rules may be implemented using expressions having logical references to variables. Boolean operands such as "AND," "OR," and "NOT", along with other operands or types thereof, may be used to define such expressions. It will be appreciated that virtually unlimited business rules and combinations thereof are definable. Business rules may be predetermined, or may be modified based on operation of DMC TDS 101. In one exemplary implementation, digital licenses are digital keys used to unlock encrypted digital media content. It will be appreciated, however, that digital licenses may be implemented in other manners.

Media sources 114 are suppliers of commercial and non-commercial media content items and metadata relating thereto. Examples of commercial media content items are broadcast or downloadable program content (such as documents, spreadsheets, audio files, video files, text files, image files, multimedia files, interactive multimedia files, or data files) available from network-based media service providers such as studios, cable operators, satellite operators, wireless or wireline phone or data service providers, Internet-based services, and the like. Providers of commercial media content items are generally concerned with reducing the likelihood of illegal sharing of media content items that are protected by enforceable intellectual property rights such as patent copyrights, patent rights, trademark rights, or trade secret rights. Non-commercial digital media content is generally media content created by individuals for personal use, such as photos, music, videos, playlists, and the like.

Advertising content sources 118 are suppliers of digital advertisements and metadata associated with digital advertisements. Like media content items supplied by media sources 114, digital advertisements are generally documents, spreadsheets, audio files, video files, text files, image files, multimedia files, interactive multimedia files, or data files. Metadata is any information, in any form or format, about the digital advertisements or information regarding the association(s) of digital advertisements with media content items (if any) supplied by media sources 114 with which the digital advertisements are presentable.

Digital media content 212 from any source may be stored on computer-readable media associated with one or more source devices 102 accessible via one or more networks 110. Examples of source devices 102 include networked servers and portable or non-portable personal source devices 102 such as personal computers, set-top boxes, mobile phones, personal digital assistants, personal computers, personal audio or video players, computer/television devices, hard-drive storage devices, video cameras, DVD players, cable modems, local media gateways, and devices temporarily or permanently mounted in transportation equipment such as wheeled vehicles, planes, or trains. Such digital media content 212 may exist any known or later developed format or combination thereof, such as various text formats, document formats, spreadsheet formats, portable network graphics ("PNG"), joint photographic experts group ("JPEG"), moving picture experts group ("MPEG"), multiple-image network graphics ("MNG"), hypertext markup language ("HTML"), Adobe Acrobat ("PDF"), extensible HTML ("XHTML"), GIFF, MP3, WAV, DVR-MS, AVI, MOV, or Microsoft® Windows Media® player formats such as WMA, WMV, or ASF.

Figure 13:
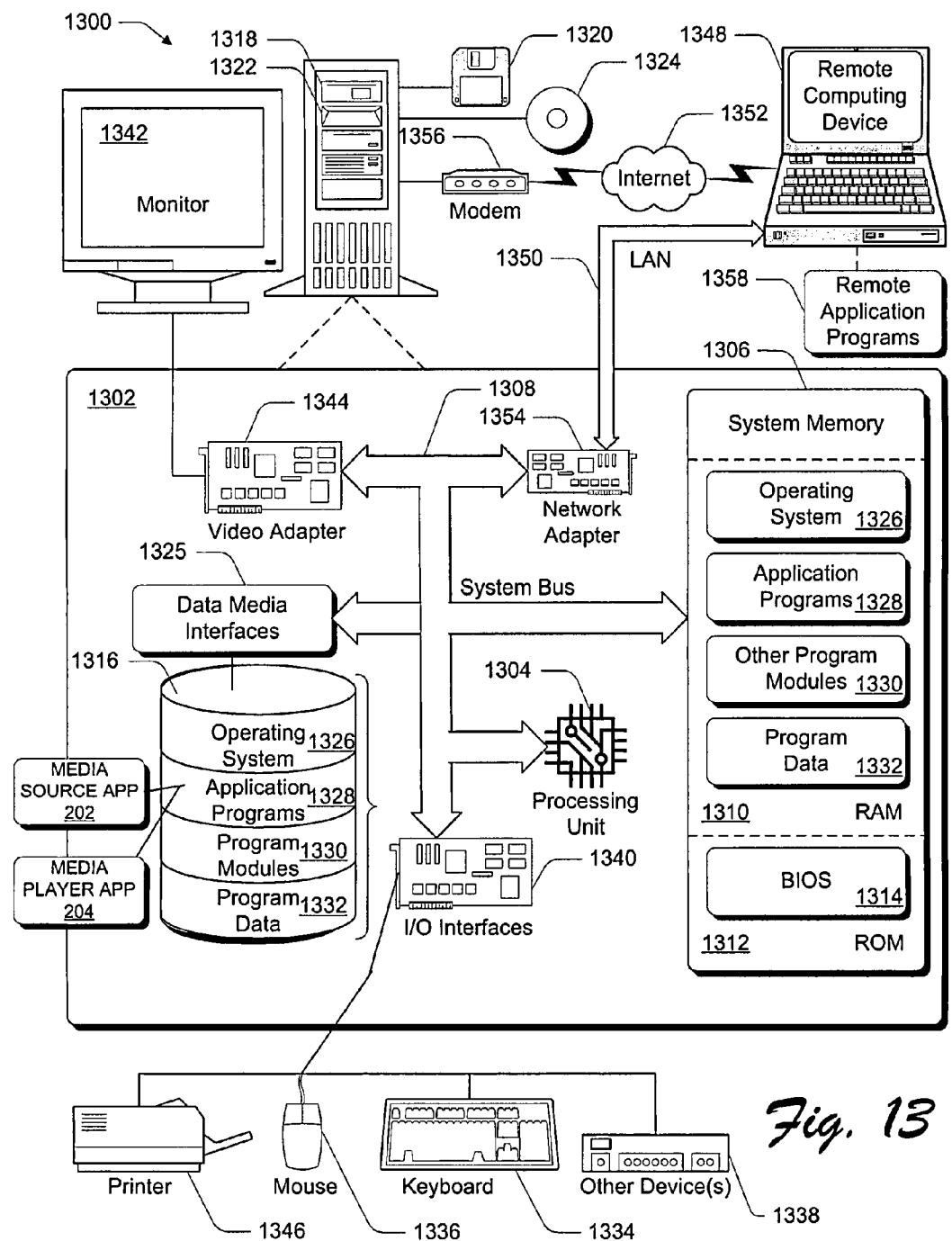
FIG. 13 illustrates an exemplary operating environment in which the digital media content transcoding and distribution system shown in FIG. 2 may be implemented or used.

Source device 102 represents any computing device having physical or logical connections to one or more remote computers, such as via one or more networks 110. Source device 102 is configured to receive and store digital media content 212, and transcodes such digital media content 212 for distribution to one or more target devices 104 via one or more communication networks 110 using aspects of digital media content transcoding and distribution system 101. An example of a source device 102 is depicted in FIG. 13 and discussed further below.

Target device 104 is any personal computing device (or any physical or logical element of such a devices, either standing alone or included in other devices), which is configured to receive digital data via one or more communication networks 110. Examples of target devices 104 include but are not limited to devices having media players, such as personal computers, personal audio or video players, mobile phones, computer/television devices, hard-drive storage devices, video cameras, portable navigation devices ("PNDs"), DVD players, cable modems local media gateways, and devices temporarily or permanently mounted in transportation equipment.

Collectively, communication networks 110 represent any one or more existing or future, public or private, wired or wireless, wide-area or local-area, packet-switched or circuit-switched, one-way or two-way digital data transmission infrastructures or technologies, operated by any type of network providers, which provide downstream transport for digital media content 212 directed to target device(s) 104. Several exemplary types of communication networks 110 are shown, including the Internet 120, managed wide area networks ("WANs") 130, and private carrier networks 140. Cellular networks, satellite networks, fiber-optic networks, co-axial cable networks, hybrid networks, copper wire networks, and over-the-air broadcasting networks such as television and radio networks are some examples of managed WANs and private carrier networks.

Communication between nodes of networks 110 and target device(s) 104 may occur via communication session 109 using any now known or later developed protocol or technique. Exemplary communication protocols include but are not limited to: Internet protocols, mobile data transmission protocols, cable data transmission protocols, over-the-air broadcasting protocols, and satellite transmission protocols.

Figure 2:
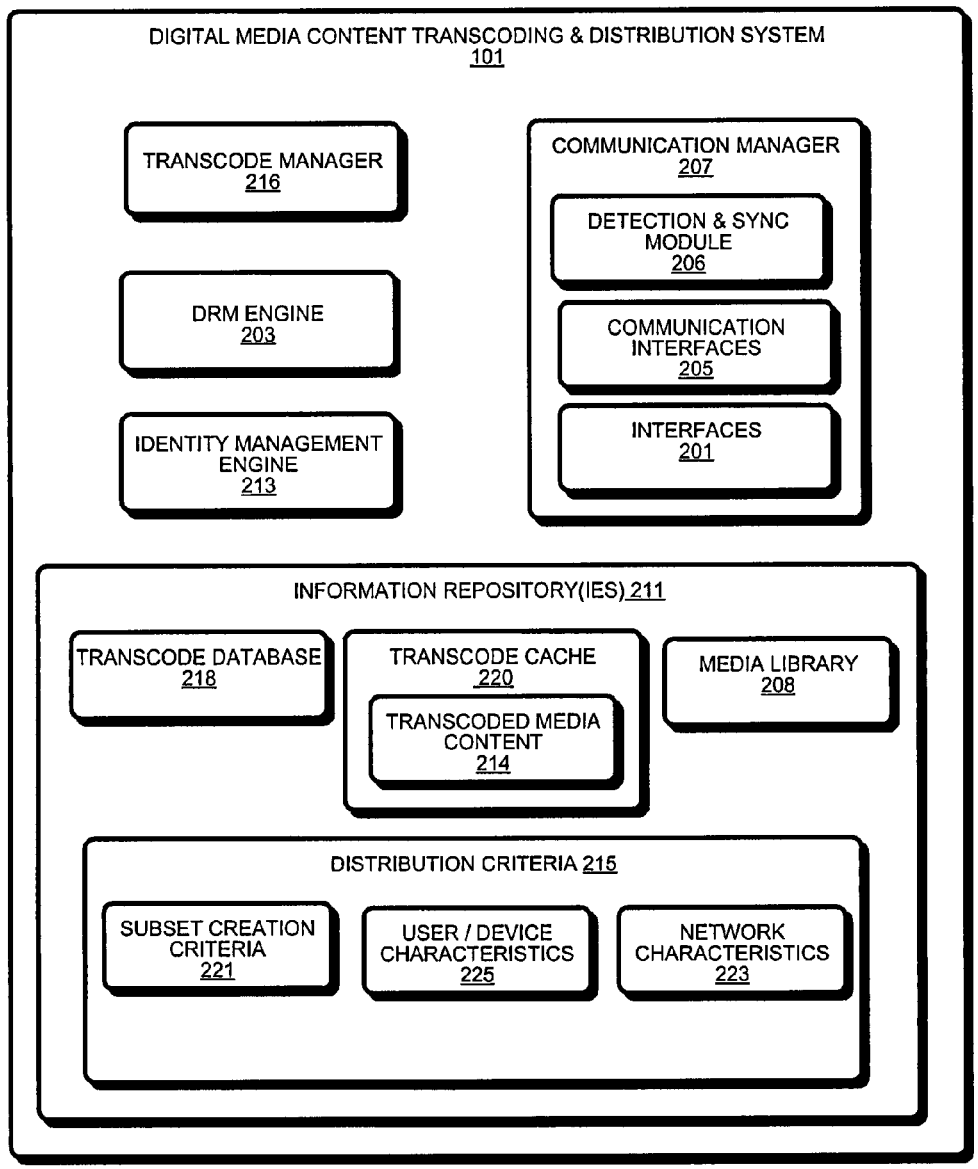
FIG. 2 illustrates a block diagram representation of aspects of the digital media content transcoding and distribution system shown in FIG. 1.

With continuing reference to FIG. 1, FIG. 2 is a simplified functional block diagram of DMS TDS 101, which is generally responsible for collecting, organizing, and transcoding digital media content 212 originating from one or more sources, and distributing transcoded digital media content to target device(s) 104 via communication network(s) 110. Generally, there is a one-to-many relationship between DMS TDS 101 and target devices 104, and it will be understood that features or components applicable to a particular target device 104 are also applicable to large numbers of similar and dissimilar target devices 104.

DMC TDS 101 includes: a transcode manager 216; a DRM engine 203; an identity management engine 213; a communication manager 207, which further includes user interfaces 201, a detection and sync module 206, and communication interfaces 205; and one or more information repositories 211. As shown, information repositories 211, which represent general data storage capability for information, further include information regarding various kinds of data created, managed, or used by components of DMC TDS 101, including but not limited to: transcode database 218; transcode cache 220, which stores transcoded media content 214; media library 208; and distribution criteria 215, which include subset creation criteria 221, user/device characteristics 225, and network characteristics 223.

In general, design choices dictate how specific functions of DMC TDS 101 are implemented, if at all. Such functions may be implemented using hardware, software, firmware, or combinations thereof. It will also be appreciated that implementations of the functions of DMC TDS 101 are tailored to the particular environment in which DMC TDS 101 operates (for example, in a network-side environment or a client-side environment). Particular configurations of DMC TDS 101 may include fewer, more, or different components than those described. In one scenario, source device 102 implemented as a networked server within or on the edge of one or more networks 110 may use certain functional implementations of DMC TDS 101. In another scenario, target devices 104 may use other (generally complementary) functional implementations. It will also be appreciated that functional components of DMC TDS 101 may be implemented by one or more devices, which are co-located or remotely located, in a variety of ways. For example, information within information repositories 211 may be stored in a distributed fashion, such as within multiple servers. In another example, target-specific transcoding may be offered as a service. In one possible implementation, such a service is defined using standard Web-based protocols such as Web Service Definition Language ("WSDL").

Initially, distribution criteria 215 within information repositories 211 are discussed. Distribution criteria 215 represent any information usable for decision-making regarding transcoding or distribution of digital media content 212 originating from one or more commonly or disparately controlled source devices 102, via one or more networks 110, to one or more target devices 104

Distribution criteria 215 may be ascertained from the specifics of a particular distribution transaction, received from sources of digital media content 212, pre-programmed into, generated by, or derived from source device 102 or target device 104, obtained from communication network(s) 110, derived from identity management engine 213, or received from third parties (such as third party servers or service providers). Distribution criteria 215 may include expressions involving logical references to variables. It will be appreciated that virtually unlimited distribution criteria 215 and combinations thereof are definable.

User/device characteristics 225 are one type of distribution criteria 215. User/device characteristics 225 are generally used to select the format to which digital media content 212 is transcoded prior to distribution to target device(s) 102. User profiles are one example of user characteristics. Certain general information within a user profile may be received directly from a user—for example, a user may input data into a portable device, or supply data to a network operator upon subscribing to use, or in connection with the use of, network resources. Other information within a user profile may be collected based on specific activities of the user with respect to DMC TDS 101. Examples of information within user profiles include user preferences, age, gender, geographic location, or affiliations with other people or services as determined by demographic groups, buddy lists, user communities, or service subscriptions. To address privacy concerns, users may have control over whether and/or which information is collected and included in user profiles, and may also have control over how or by whom such information is used or accessed. Examples of device characteristics include but are not limited to information about a particular target device or class thereof, such as device type, identification numbers, destination address information, processing capability, network connectivity capabilities, display capabilities, and memory capabilities.

Network characteristics 223, which represent dynamic or static characteristics of communication network(s) 110, are another type of distribution criteria 215. Network characteristics 223 are also generally used to select the format to which digital media content 212 is transcoded prior to distribution to target device(s) 102. Examples of network characteristics 223 include but are not limited to network latency, network availability, network bandwidth, network usage level, network reliability, and network usage cost.

Subset creation criteria 221 are used to decide how, when, or which digital media content 212 is organized into subsets for transcoding and/or storage by one or more source devices 102. Subsets of transcoded digital media content 212 may be formed and/or stored based on criteria 221 (or combinations thereof) such as: user requests; user/device characteristics 225; network characteristics 223; temporal references (such as times, dates, or time zone data); media content-related information (such as media type, parental control ratings, presentation formats or quality, price/promotions, genre, source, titles, artists, release dates, times, and the like); targeting rules for organizing destination addresses associated with particular target devices into groups based on predetermined characteristics (such as geographic location, age, gender, media player characteristics, and the like); and rules for associating customized sets of transcoded digital media content with particular target devices or groups thereof.

Media library 208 represents a repository of media accessible to DMC TDS 101. In general, media library 208 includes a catalog of media items available to DMC TDS 101 from a variety of sources, some manual and some automatic. It may represent media physically stored on source device 102 where DMC TDS 101 is implemented or include references to digital media content 212 on external media sources 114, license sources 116, or advertising content sources 118 accessible via communication interfaces 205 or another method. Since digital media content 212 may not be directly stored by media library 208, media library 208 generally provides methods for determining whether or not digital media content 212 is available ("in the library"), requesting digital media content 212 from media sources (114, 116, 118), and determining the status of the requested media. The items found in media library 208 may have been specified by a user 111 of target device 104 or source device 102. They may be located, cataloged, or recorded by media source applications 200 (defined with reference to FIG. 13).

Referring again to DMC TDS 101, communication manager 207 includes interfaces 201, communication interfaces 205, and detection and sync module 206. In instances where DMC TDS 101 is implemented in an environment supporting direct user interaction, interfaces 201 may be implemented as a user interface. User interfaces are physical or logical elements that define the way a user interacts with a particular application or device. Generally, presentation tools are used to receive input from, or provide output to, a user. An example of a physical presentation tool is a display such as a monitor device. An example of a logical presentation tool is a data organization technique (such as a window, a menu, or a layout thereof). Controls facilitate the receipt of input from a user. An example of a physical control is an input device such as a remote control, a display, a mouse, a pen, a stylus, a microphone, a keyboard, a trackball, or a scanning device. An example of a logical control is a data organization technique via which a user may issue commands. It will be appreciated that the same physical device or logical construct may function as an interface for both inputs to, and outputs from, a user. Alternatively, in environments where DMC TDS 101 is implemented on network-side computers, interfaces 201 may represent service interfaces accessible over the network. These services provide for access to and manipulation of information about the current state of DMC TDS 101 from components of DMC TDS 101 operating on client-side target devices 104.

Communication interfaces 205 represent one or more physical or logical elements, such as connectivity devices or computer-executable instructions that enable communication between DMC TDS 101 and/or source device 102 and target device 104 (and in the context of source device 102, communication between source device 102 and one or more sources 114, 116, or 118) via one or more communication networks 110. It will be appreciated that local communication can occur via cables or cable replacement technologies. Information received at a given network interface may traverse one or more of the seven vertical layers of the OSI Internetworking Model: layer 1, the physical layer; layer 2, the data link layer; layer 3, the network layer; layer 4, the transport layer; layer 5, the session layer; layer 6, the presentation layer; and layer 7, the application layer.

Detection and sync module 206 is configured to establish communication sessions 109 between target devices 102 and network nodes hosting aspects of DMC TDS 101 and/or source devices storing digital media content 212. More specifically, detection and sync module 206 provides a user-configurable model for discovering aspects of one or more DMC TDS 101 systems hosted within one or more networks 110, and for facilitating the transfer of transcoded digital media content 214 (discussed further below) between a source device 102 to one or more target devices 104. In one scenario, detection and sync module 206 may assign a transfer priority to files of digital media content 212 stored in a particular source device 102 to indicate their relative importance or desirability to the user. In an alternate embodiment, detection and sync module 206 may assign a transfer priority to files of digital media content 212 destined for a particular target device 104. Transfer priorities may be based on criteria such as distribution criteria 215, such as group characteristics. For example, many thousands of devices in certain areas may have requested the same television program, or processing loads in particular CPUs or computer systems may be adjusted based on aggregate group characteristics.

DRM engine 203 represents any digital rights management system or technique operable to enable acquisition of digital licenses covering aspects of the operation of DMC TDS 101.

Identity management engine 213 is responsible for establishing a level of trust between two endpoints in a communication session, such as between a target device 104 and a network-side entity (such as a source device 102 and/or a network node). There are numerous well-known techniques available for establishing trust between parties through authentication and authorization schemes. In general, however, identity management engine 213 implements aspects of an identity management system in conjunction with such authentication and authorization schemes. The identity management system provides for: representing identities using pieces of information about the subject of the identity that the issuer (which may be the subject itself or another entity) asserts are valid (such pieces of information are referred to as "claims"); conducting communications between identity providers, relying parties, and identity subjects; and protocol(s) for handling claims. In one exemplary implementation, target device 104 facilitates selection of a particular identity associated with user 111 and/or target device 104 for presentation to a network-side implementation of DMC TDS 101 and/or source device 102 to achieve varying amounts of access to transcoded digital media content 212 stored via source device 102.

Transcode manager 216 is responsible for creating and handling transcoded digital media content 214. In the context of a network-side implementation of DMC TDS 101, transcode manager 216 handles transcoding and storage of digital media content 212 in anticipation of being transferred to one or more target devices 104. It will be appreciated that it is possible to use various distribution criteria 215 to identify specific digital media content 212 for transcoding and distribution to a particular target device 104. It will also be appreciated that transcode manager 216 interacts with other components of DMC TDS 101 (such as communication manager 207 and elements thereof, DRM engine 203, identity management engine 213, and information repositories and information stored therein. In an example relating to DRM engine 203, DRM engine 203 is generally contacted to obtain keys that enable decryption of encrypted digital media content 212 prior to, or during, the transcoding process. DRM engine 203 is also generally contacted to issue new keys to re-encrypt transcoded media content 214. It is possible that distribution criteria 215 (for example business rules associated with protection of intellectual property rights) will be different.

Transcode database 218 generally includes media status information regarding one or more potential target devices 104 and device capability information regarding the potential target devices 104. Although the term database is used, it will be appreciated that a database is but one possible implementation of a component for tracking information on a device (such a component may be generally be referred to as a "device media status store") and a component for tracking the capabilities of a device (such a component may be referred to generally as a "device capability store"). Transcode database 218 may be implemented on source device 102 by the use of database tables that track both media status information and device capabilities. In FIG. 3, for example, four potential target devices (A, B, C, and D) are shown, with additional details provided for target device A. For each potential target device, the example media status information in the transcode database tables includes a "Desired Media" data column, which indicates the media that a user desires to have transferred to the target device during the next synchronization process, a "Media In Media Library Yet?" data column, which indicates whether the desired media has been stored in the media library 208 yet, a "Media On Target Device Yet?" data column, which indicates whether the desired media has been transferred to the target device yet, and a "Media Transcoded Yet?" data column, which indicates whether the desired media has been transcoded and stored in the transcode cache 220. Alternate embodiments may also include information about the users with which the device is associated. The database also includes information about the capabilities of each potential target device 104. The device capabilities information includes data such as the media file formats a device is capable of playing back (e.g., GIF, JPEG, MP3, WMA, AVI, WMV, etc.), the bit rate that the device is capable of handling, and the screen resolution the device has assuming the device is video capable. It is noted that the manner and extent of the media and capabilities information illustrated and discussed with respect to FIGS. 3-5 is intended as an example only, and is not intended as a limitation as to the manner and extent of any information that might be stored in a database implementation of transcode database 218. An alternate embodiment of transcode database 218 may include querying the device directly to discover both its capabilities as well as the media status on the device. A temporary cache of media status on source device 102 is used during the transcoding process. This model is particularly beneficial when the device will be contacting multiple different source devices 102. In another alternate embodiment, it is envisioned that a manufacturer or provisioning organization of a particular target device 104 (such as a portable device) may create a network repository where information about the capabilities of the device may be acquired. Under this model, transcode database 218 may contact the network repository to determine the particular capabilities for both the device and the network. The manufacturer or provisioning body may also provide user-specific information, such as preferences or rights, to transcode database 218 as part of this communication.

Transcode manager 216 monitors and updates transcode database 218 in order to control a transcoding process (that may run in the background on one or more source devices 102) such that transcoded media content 214 is stored in transcode cache 220 and ready to be transferred to target device(s) 104 when the device(s) are connected to source device 102 via communication network(s) 110. In keeping with DMC TDS 101's ability to support a large number of geographically dispersed target devices 104, transcode cache 220 may be implemented across multiple different network-side or client-side devices. Reasons to have various transcode caches 220 include but are not limited to management of storage space or transcode processing/event planning. Transcoded content can be cached for groups of users or devices and transferred (many times to an unlimited number of other devices) when it is detected that a particular client-side device matching certain criteria, such as distribution criteria 215. It should be noted that target device 104 may be in communication with aspects of DMC TDS 101 hosted by a network-side entity (such as a network service or a different source device) prior to establishing a direct or indirect virtual, logical, or physical connection with source device 102 storing transcoded media content 214. In one scenario, detection and sync module 206 updates transcode database 218 with the desired media content for each target device 104 and with information about whether that content has been transferred and/or transferred to the device. Detection and sync module 206 can also check the arrival of new media content 212 in the media library 208 against the desired media content for each target device 104, and determine whether the desired media has been transferred to the appropriate target device 104. In an alternate embodiment, transcode database 218 is able to rationalize changes that have occurred on source device 102 and target device 104 via an exchange of metadata that describes the content of the device.

If desired media is available that has not been transferred to the appropriate target device 104, the transcode manager 216 determines from the transcode database 218 whether the desired media has been transcoded according to the device's capabilities and stored in the transcode cache 220. As discussed above, it will be understood that transcoded content may be cached for groups of users or devices and transferred when it is detected that a particular target device matching certain criteria, such as distribution criteria 215, is available, or upon receipt of a request from a particular target device. If there is media content 212 in the media library 208 that needs to be transcoded for a target device 104, transcode manager 216 determines the capabilities of the device from the transcode database 218, accesses the appropriate media content from the media library 208, transcodes the media content, and stores the transcoded media content 214(A) into the transcode cache 220. Upon the next connection of the appropriate target device 104, transcode manager 216 determines from the database that transcoded media content 214(A) is available to be transferred. Transcode manager 216 then notifies the sync module 206 that the transcoded media content 214(A) is available in the transcode cache 220 to be transferred to the target device. In another implementation, the transcode manager 216 itself transfers the transcoded media content 214(A) to the target device 104.

The process of transcoding media files is well-known and can include (depending on device capabilities), for example, converting a media file from one format to another (e.g., MP3 to WMA) so the file will play on the target device 104, down-sampling a media file to a lower bit rate for compatibility with the target device and to reduce the amount of storage space needed on the target device, and adapting the screen size of a video file so the video plays back correctly on the target device. Transcoding is often used to convert a media file to a format having lower CPU requirements for decoding, since higher quality content targeted at "desktop" computers and other media specific devices may be too complex to decode effectively on a device with a lower-powered processor, such as those typically found in a portable media device. Transcoding can also include various other processes for altering media files, and those mentioned herein are included by way of example only and not by way of limitation. Thus, other examples of transcoding include altering the word length of individual data samples (e.g. 24 bit to 16 bit), independently of the actual bit rate, changing the decryption keys or technology to allow devices that use alternate DRM systems to access the content using a different DRM system from the source, altering the complexity profile of the encoder portion of the transcoding process to a more complex or more simple resultant file for purposes of managing CPU requirements at the destination device, and changing representative color spaces between the source and destination files as required by the target device (e.g. YUV to RGB, or vice versa). In addition, network considerations may be made when determining how to transcode a particular file. The latency and bandwidth of a particular network connection may be used to determine the appropriate bit rate for the file independent of the capabilities of target device 104.

An example of managing background transcoding processes through transcode database 218 can be demonstrated with reference to a "Target Device A" as shown in FIGS. 3-5. It will be understood that the following example is only one possible example, and that implementation detail modifications may result in alternative operation(s). Moreover, in keeping with DMC TDS 101's ability to support a large number of geographically dispersed target devices 104, it will be appreciated that Target Device A may in fact refer to a large number of like devices, or families of devices. Within the columns of the example database tables of FIGS. 3-5, a check mark "✓" is intended to provide an affirmative indication, while an "X" is intended to provide a negative indication. In FIG. 3, information in the "I" column labeled "Desired Media" indicates that a user desires that episodes of "Friends", "Cops", and the "Simpsons" be copied to Target Device A when the target device is connected to the source device 102. The desired media information in database 218 typically originates from user entries communicated from target device 104 to source device 102 through an interface 201.

In FIG. 3, check marks in the $2^{nd}$ column labeled "Media In Media Library Yet?" indicate that media files for an episode of Friends and an episode of Cops (i.e., both from Desired Media column) have been stored in the media library 208. The "√" in the 2$^{nd}$ column indicates that there is not a media file for the Simpsons in the media library 208. Likewise, "X"'s in the 3$^{rd}$ column indicate that none of the desired media has been transferred yet to the target device, and "X"'s in the 4$^{th}$ column indicate that none of the desired media has yet been transcoded and stored in the transcode cache 220.

When a desired media file is stored in the media library 208, such as with the media files for Friends and Cops as shown in FIG. 3, the transcode manager 216 begins transcoding the media file in anticipation of copying the transcoded media to the target device. In general, desired media files are transcoded in the order in which they become available in the media library 208. However, as discussed below, the transcoding priority can change.

Prior to transcoding a media file, the transcode manager 216 determines the target device capabilities from the transcode database 218 and transcodes the media file accordingly. As shown in the 5$^{th}$ column of FIG. 3, the indicated device capabilities may include, for example, available file formats, bit rates, and screen resolution for the specified target device (i.e., Target Device A).

Thus, assuming in FIG. 3 that the Friends episode has been recorded in the media library 208 prior to the Cops episode, the transcode manager 216 begins transcoding the media file for the Friends episode, after which it transcodes the media file for the Cops episode. The transcode manager 216 stores the transcoded media files in the transcode cache 220 as transcoded media content 214(A) where it remains until it is transferred to the target device upon connection of the target device with the source device.

FIG. 4 illustrates a possible future state of the database table shown in FIG. 3. In FIG. 4, check marks in the 2$^{nd}$ column indicate that all the desired media content identified in the 1$^{st}$ column has been stored in the media library 208. Check marks in the 4$^{th}$ column further indicate that this media content has already been transcoded and stored in the transcode cache 220 as transcoded media content 214(A). Upon connection of Target Device A 104 with source device 102, the transcode manager 216 checks the transcode database 218 and determines that the desired media content for Target Device A has already been transcoded and is stored in the transcode cache 220. The transcode manager 216 can then manage the copying of the transcoded media content 214(A) directly to the target device 104, or can notify another tool, such as the sync module 206, that the transcoded media content 214(A) is ready to be transferred to the target device 104.

FIG. 5 illustrates yet another possible future state of the database table shown in FIG. 3. In FIG. 5, check marks in the 2$^{nd}$, 3$^{rd}$, and 4$^{th}$ columns indicate that the desired media identified in the 1$^{st}$ column for Target Device A has been stored in the media library 208, and that it has already been transcoded and copied to Target Device A. After transcoded media content 214(A) in the transcode cache 220 has been transferred to the appropriate target device 104, transcode manager 216 typically deletes it from the cache. However, transcode manager 216 may first evaluate the transcode database 218 with respect to other target devices (e.g., Target Devices B, C, and D; FIG. 3) and determine if the transcoded media content is desired by any of these other devices. If so, the transcode manager 216 will retain the transcoded media content in the transcode cache until such time as it is copied to the other device or devices. In network-side environments, transcode manager 216 may further relax the rules for determining if a particular piece of transcoded media content 214(A) is to be released. To best serve requests from a larger number of devices, both those known and anticipated, transcode cache 220 may implement an aging algorithm for transcoded media content 214(A). For example, it may delete a piece of content within a certain period of time (for example, one week after it was last used), or if space is needed for new transcoded content, or for any combination of reasons.

As mentioned above, desired media files are generally transcoded in the order in which they become available in the media library 208. However, the priority in which media files from the media library 208 are transcoded for target devices can change, especially where more than one target device 104 is involved. For example, FIG. 6 illustrates an example of media files that have been stored in the media library 208 in the order in which they were received into the media library. In this example, each of the media files is a desired media file with respect to one or more target devices 104.

Also shown in FIG. 6, is an example of a Transcode Priority Queue that may be a part of the transcode database 218. As the Transcode Priority Queue indicates, desired media files from the media library 208 are normally transcoded in the order in which they arrive in the media library 208. Thus, in the FIG. 6 scenario, the media file for the Friends episode would be transcoded first for target device A, the media file for the 60 Minutes episode would be transcoded second for the target device C, and so on, until the media file for the Simpsons episode is transcoded last for target device A. FIG. 7 illustrates an exemplary transcode timeline that shows this typical priority order of transcoding the media files shown in FIG. 6.

In certain circumstances, however, the typical priority order of transcoding can change. For example, referring again to FIG. 6, assume that the transcode manager 216 has already transcoded the media file for the Friends episode and is in the process of transcoding the media file for the 60 Minutes episode. Further assume that during the 60 Minutes transcode process, a user connects target device A to source device 102. In such a circumstance, it is clear that the user wants target device A synchronized with desired media content for that device. Therefore, transcode manager 216 is configured to adjust the transcode priority queue to accommodate the circumstance. In this case, transcode manager 216 interrupts the transcode process for the 60 Minutes episode and bumps up the transcode priority for all media files that are desired media files for target device A. Thus, as indicated by the arrows 600 of FIG. 6, the media files for the Cops episode and the Simpsons episode are bumped up in front of the 60 Minutes episode, and the transcode manager 216 immediately begins transcoding these media files. In another example, transcode manager 216 may be running on multiple network-side operating environments, and many items may be queued for transcoding based on various combinations of distribution criteria 215 (such as characteristics of target devices or groups thereof). Transcode priorities can be adjusted in many ways. For example, transcode priorities may be adjusted based on the number of devices requesting particular digital media content (for example, if the popularity of a certain television show escalates in one geographic area, transcode manager 216 may increase its transcoding priority, re-prioritize other content, and/or relocate the transcoding process to a processor with more capacity, such as a different CPU on the same system, a different blade in a server rack, a different server in the mesh, or a server with a more optimized network path to the target device(s)).

FIG. 8 further illustrates this scenario with an exemplary transcode timeline. The transcode timeline of FIG. 8 shows that the Friends media file desired for target device A is transcoded first, after which the 60 Minutes episode desired for target device C begins the transcoding process. Part way through the 60 Minutes transcode, the transcode manager 216 interrupts the process and begins to transcode the remaining desired media files for target device A (i.e., the Cops episode and the Simpsons episode). The interrupt is indicated in FIG. 8 by the timeline break 800, and is initiated by a user connecting target device A to source device 102. After the transcode process is completed for desired media files indicated for target device A, the transcode manager 216 resumes the previously interrupted transcoding process for the 60 Minutes episode. The resumption of transcoding for the 60 Minutes episode is indicated in FIG. 8 by the timeline break 802.

Figure 9:
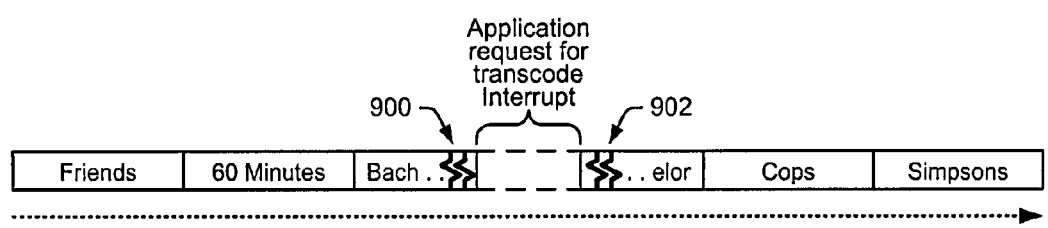
FIG. 9 illustrates an exemplary transcode timeline with an interrupted transcode priority.

In another circumstance, the transcode priority can be interrupted or throttled based on a request from an application, or in the case of a network-side implementation of transcode manager 216, for load balancing. In some cases transcode activity can be moved to an alternate CPU or server to achieve load balance. Because transcoding can be a processor intensive task, the transcode manager 216 enables applications to request that the transcode process be interrupted, throttled back, or moved to a different CPU or server in order that the processor is free to perform tasks associated with the requesting application. FIG. 9 illustrates an example transcode timeline where the general order of transcoding shown in FIG. 6 is proceeding, but is interrupted by an application request to discontinue the transcoding process. In FIG. 6, a media file for the Bachelor is being transcoded after media files for Friends and for 60 Minutes have already been transcoded. During the transcoding of the Bachelor media file, the transcode manager 216 interrupts the transcode process due to a request made by an application. Such a request might be to discontinue the transcoding until such time as a particular process related to executing the application has been completed. In FIG. 9, the timeline break 900 part way through the Bachelor indicates where the transcode manager 216 discontinues the transcoding process based on a request by an application, and the timeline break 902 indicates where the transcode manager 216 resumes the transcoding process once the application request has been honored.

Figure 10:
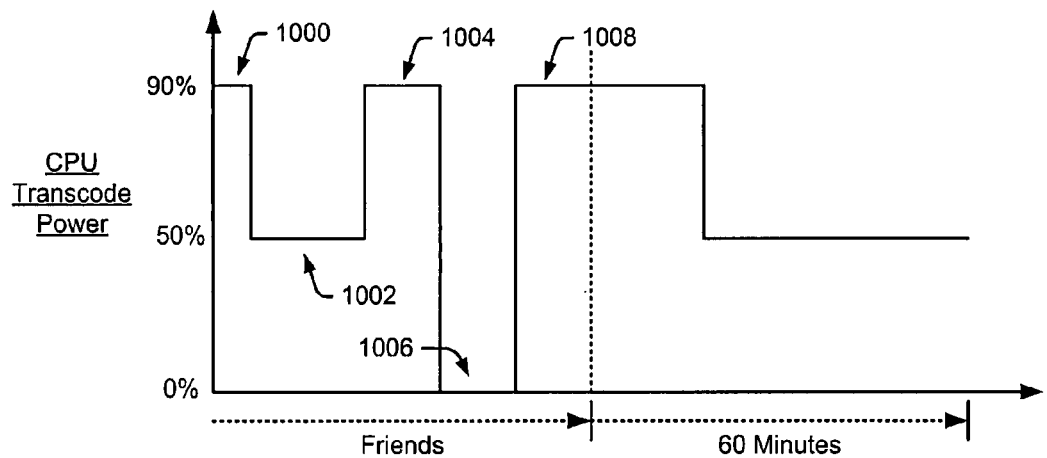
FIG. 10 illustrates an exemplary transcode process with throttling of processing power devoted to the transcode process.

FIG. 10 illustrates an example where an application request causes the transcode manager 216 to throttle back the CPU power being devoted to the transcoding process on the source device 102. Thus, a request from an application may indicate the amount of CPU power the application needs to execute, enabling the transcode manager 216 to determine how much to throttle back the CPU power being devoted to a transcoding process. In the FIG. 10 example, during a $1^{st}$ time period 1000, 90% of the CPU power is being devoted to transcoding a media file for a Friends TV episode. During a $2^{nd}$ time period 1002, the transcode manager 216 has throttled back the CPU power devoted to transcoding the Friends episode to 50% due to a request from an application. During a $3^{rd}$ time period 1004, the CPU power devoted to transcoding is throttled back up to 90%. During a $4^{th}$ time period 1006, the CPU power devoted to transcoding is throttled to 0% (i.e., transcoding is discontinued), and then during a $5^{th}$ time period 1008, the CPU power devoted to transcoding is throttled back up to 90%. It is noted that the description of throttling provided above with respect to FIG. 10 is intended as an example only and not as any limitation as to the nature, manner or amount of throttling capable by the transcode manager 216.

As indicated in the previous examples of handling ordering, interruption and throttling of transcoding priority are provided as only exemplary ways in which these operations may be used by transcoding manager 216 to handle different events. Especially in network-side implementations of transcoding manager 216, alternative techniques may be applied. For example, when Target Device B connects during an existing connection with Target Device A, network-side implementation of transcoding manager 216 may adjust transcoding priority to first transcode files needed by both Target Device A and Target Device B. Once these files have been identified and transcoded based on an updated priority, network-side transcoding manager 216 may elect to create separate transaction lists and transaction processes for Target Device A and Target Device B, each including the files destined only for those devices. Network-side transcoding manager 216 would further throttle the CPU for the transcode process associated with Target Device A and Target Device B to achieve a better overall balance of CPU usage. It would also be possible to introduce a "transcode monitor" function into DMC TDS 101, to handle the task of heuristically determining the appropriate utilization of resources for transcode operations.

Figure 11:
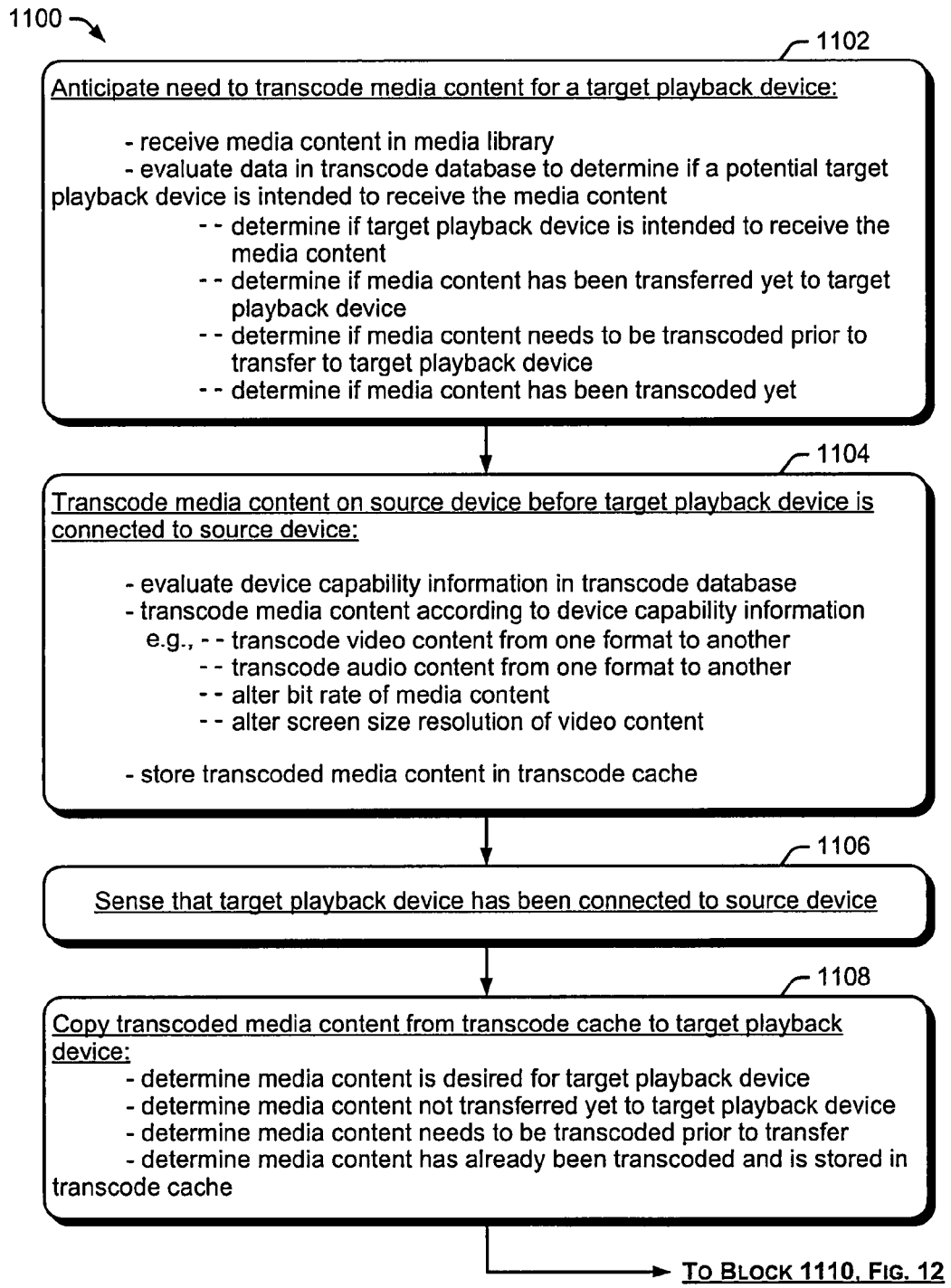
FIG. 11 is a flow diagram illustrating exemplary methods for background transcoding.

Example methods for background transcoding will now be described with primary reference to the flow diagrams of FIGS. 11 and 12. The methods apply to the exemplary embodiments discussed above with respect to FIGS. 1-10. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 1102 of method 1100, the need to transcode media content is anticipated. When media content arrives in a media library 208 on a source device 102, a transcode manager 216 evaluates information in a transcode database 218 regarding the status of media content for one or more target devices 104. The transcode manager determines from the database information whether the target device is intended to receive the media content, whether the media content has been transferred yet to target device, and whether the media content needs to be transcoded prior to transfer to the target device.

At block 1104, some or all of the media content is transcoded on the source device 102 before the target device 104 is connected to the source device. The transcoding can include typical transcoding tasks such as transcoding video media content from one format to another, transcoding audio media content from one format to another, altering the bit rate of media content, altering the encryption scheme or encryption keys or rights of the media file, and altering the screen size resolution of video media content. The transcoding also includes evaluating device capability information in transcode database to determine the target device capabilities. The transcode manager 216 transcodes the media content according to the device capability information and any DRM rights imposed by the content owner and stores the transcoded media content into a transcode cache 220.

At block 1106, a connection between the target device 104 and the source device 102 is sensed, and at block 1108, the transcoded media content is copied from the transcode cache 220 over to the target device 104. As part of the copying process, the transcode manager 216 determines that the target device is authorized and intended to receive the media content, that the media content has not yet been transferred to the target device, and that the media content has already been transcoded and is stored in the transcode cache.

Figure 12:
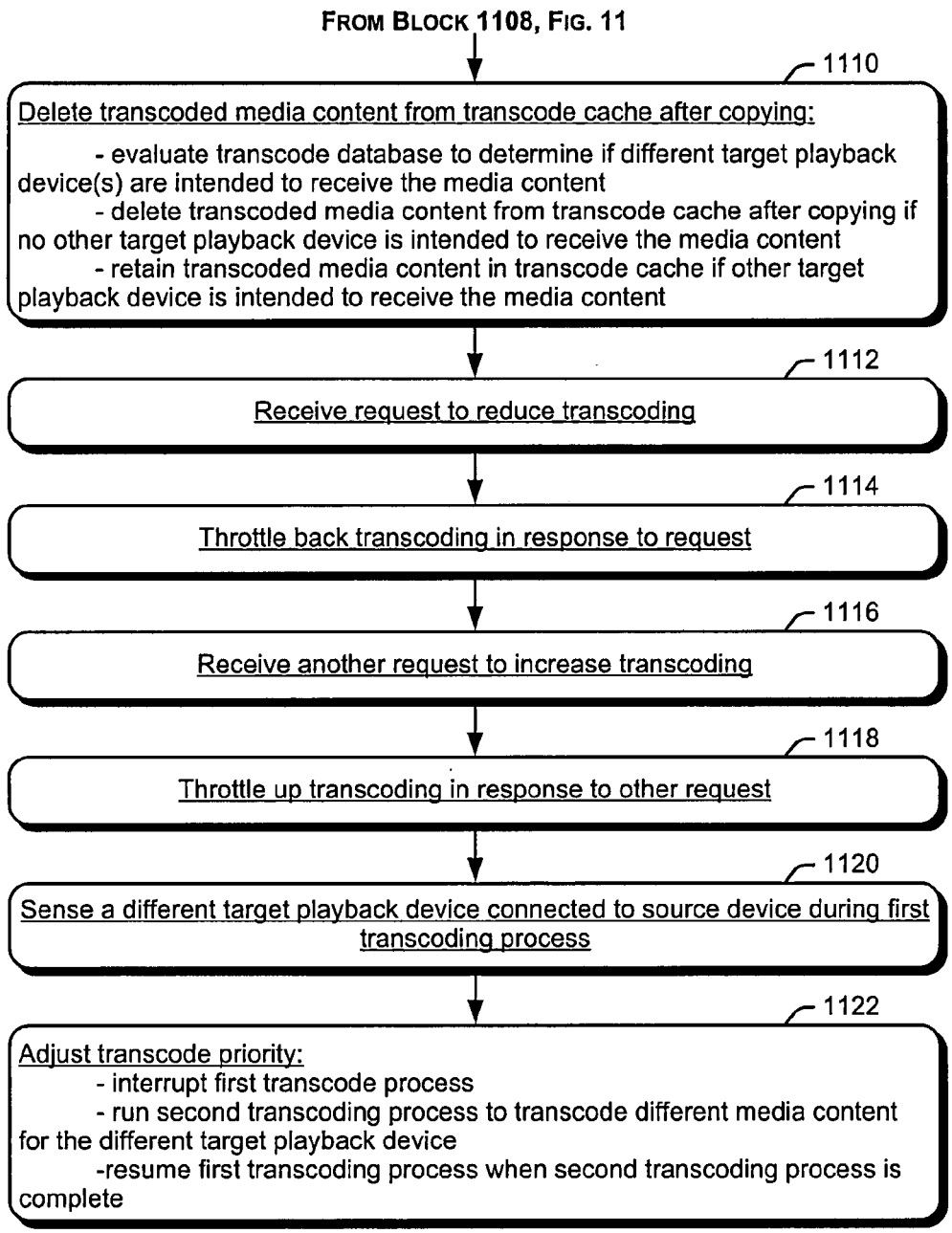
FIG. 12 is a continuation of the flow diagram of FIG. 11 illustrating exemplary methods for background transcoding.

The method 1100 continues at block 1110 of FIG. 12. At block 1110, the transcoded media content is deleted from the transcode cache after it is copied to the target device. Prior to deleting the transcoded media content, however, the transcode manager 216 evaluates the transcode database 218 to determine if other target devices are intended to receive the media content. If there are no other target devices intended to receive the media content, the transcoded media content is deleted from the cache (although it will be appreciated that especially in the case of a network-side implementation, it may be desirable to implement a more gradual phase-out of media content). However, if there is another target device intended to receive the media content, the transcoded media content is retained in the cache until it is copied to the other target device.

At block 1112, a request is received to reduce the level of transcoding. The request is typically made by an application program that is indicating an amount of processing power it needs to perform some task. Thus, the request is to reduce the amount of processing power being devoted to the transcoding. At block 1114, the transcode manager 216 throttles back the level of transcoding in response to the request. The throttling back includes reducing the amount of processing power the source device 102 is devoting to the transcoding. At block 1116, another request is received to increase or resume the transcoding. The request is typically made as a result of the application program completing the task that caused the transcode manager to throttle back the transcoding. In response to the other request, the transcode manager increases or resumes the prior level of transcoding, as shown at block 1118.

At block 1120, during the first transcoding process, a connection to a different target device is sensed. The transcode manager 216 determines if there is media content intended for the different target device, and if so, adjusts the priority in which media content is being transcoded for target media devices, as shown at block 1122. Adjusting the transcode priority of media content can include interrupting the current/first transcoding process, initiating a second transcode process to transcode different media content for the different target device, and, after the second transcode process is completed, resuming the first transcode process. In a network-side operating environment, the transcode process can be moved or restarted on a different CPU and/or server to achieve the most desirable balance. The interruption and resumption of the first transcode process is an adjustment to a normal transcode priority as generally discussed above with respect to FIGS. 6-8.

FIG. 13 is a block diagram of an exemplary configuration of an operating environment (such as a network-side operating environment implemented by a networked server 102) in which all or part of DMC TDS 101, and/or the method(s) shown and discussed in connection with FIG. 4 may be implemented or used. The operating environment is generally indicative of a wide variety of general-purpose or special-purpose computing environments, and is not intended to suggest any limitation as to the scope of use or functionality of the system(s) and methods described herein.

The operating environment 1300 includes a general-purpose computing system in the form of a computer 1302. The components of computer 1302 may include, but are not limited to, one or more processors or processing units 1304, a system memory 1306, and a system bus 1308 that couples various system components including the processor 1304 to the system memory 1306.

The system bus 1308 represents one or more of any of several types of bus structures, including a memory bus or memory controller, a peripheral bus, an accelerated graphics port, and a processor or local bus using any of a variety of bus architectures. An example of a system bus 1308 would be a Peripheral Component Interconnects (PCI) bus, also known as a Mezzanine bus.

Computer 1302 includes a variety of computer-readable media. Such media can be any available media that is accessible by computer 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 contains data and/or program modules that are immediately accessible to and/or presently operated on by the processing unit 1304.

Computer 1302 may also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1325. Alternatively, the hard disk drive 1316, magnetic disk drive 1318, and optical disk drive 1322 may be connected to the system bus 1308 by a SCSI interface (not shown).

The disk drives and their associated computer-readable media provide non-volatile storage of computer readable instructions, data structures, program modules, and other data for computer 1302. Although the example illustrates a hard disk 1316, a removable magnetic disk 1320, and a removable optical disk 1324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1316, magnetic disk 1320, optical disk 1324, ROM 1312, and/or RAM 1310, including by way of example, an operating system 1326, one or more application programs 1328, other program modules 1330, and program data 1332. Each of such operating system 1326, one or more application programs 1328, other program modules 1330, and program data 1332 (or some combination thereof) may include an embodiment of a caching scheme for user network access information.

Various components facilitate the retrieval and management of media content for the general purpose of transcoding the content and/or distributing the content to a target device 104. These components include an operating system 200, one or more media source applications 202, and a media player application 204. Although these components are illustrated separately, it is noted that any one or more of these components may be implemented in a particular operating environment as part of multimedia software product, the operating system 200, or as stand-alone components. As indicated only some of these components may be implemented within a particular environment. For example source device 102 may include only an operating system 200 and one or more media source applications 202 but no media player application 204 while target device 104 includes an operating system 200 and media player application 204 but no media source application 202.

A media source application 202 may be one or more of various applications and/or tools configured to receive media content. For example, media source application 202 may be an interactive TV service application that facilitates the recording of video (e.g., TV programming) directly off of a cable and/or satellite feed, a video capture component to transfer home video footage from a digital video recorder onto source device 102, a Web browser application that facilitates downloading media off the Internet, protocols adapters/ interfaces that receive digital media content from various sources, and so on. Such media source applications 202 typically supply various forms of media content 212 to a media library 208 on source device 102. Thus, media content 212 stored in media library 208 may include, for example, audio files in the form of MP3 and WMA files, video files in the form of DVR-MS, AVI and MOV files, and image files in the form of GIF and JPEG files.

A media source application 202 may also include or be part of a media player application 204. A media player application 204 is typically a desktop (or server) based application player that manages a broad range of multimedia related tasks. For example, a media player application 204 may handle streaming audio and video, CD/DVD playback, MP3 and WMA support, encoding, CD/DVD burning, Internet radio, and the like. A media player application 204 may also offer Web browser integration so it can be embedded in a browser enabling multi-tasking during streaming video. Like other media source applications 202, a media player application 204 may supply various forms of media content 212 (e.g., audio files, video files, image files, etc.) to a media library 208 on source device 102.

Computer 1302 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device may also be connected to the system bus 1308 via an interface, such as a video adapter 1344. In addition to the monitor 1342, other output peripheral devices may include components such as speakers (not shown) and a printer 1346 which can be connected to computer 1302 via the input/output interfaces 1340.

Computer 1302 may operate in a networked environment using logical connections to one or more remote computers, such as a remote computing device 1348. By way of example, the remote computing device 1348 can be a personal computer, portable computer, a server, a router, a network computer, a peer device or other common network node, and the like. The remote computing device 1348 is illustrated as a portable computer that may include many or all of the elements and features described herein relative to computer system 1302.

Logical connections between computer 1302 and the remote computer 1348 are depicted as a local area network (LAN) 1350 and a general wide area network (WAN) 1352. Such networking environments are commonplace in offices, enterprise-wide computer networks, intranets, and the Internet. When implemented in a LAN networking environment, the computer 1302 is connected to a local network 1350 via a network interface or adapter 1354. When implemented in a WAN networking environment, the computer 1302 includes a modem 1356 or other means for establishing communications over the wide network 1352. The modem 1356, which can be internal or external to computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with operating environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components, such as the operating system, are illustrated herein as discrete blocks, although it is recognized that such programs and components reside at various times in different storage components of the computer system 1302, and are executed by the data processor(s) of the computer.

Figure 14:
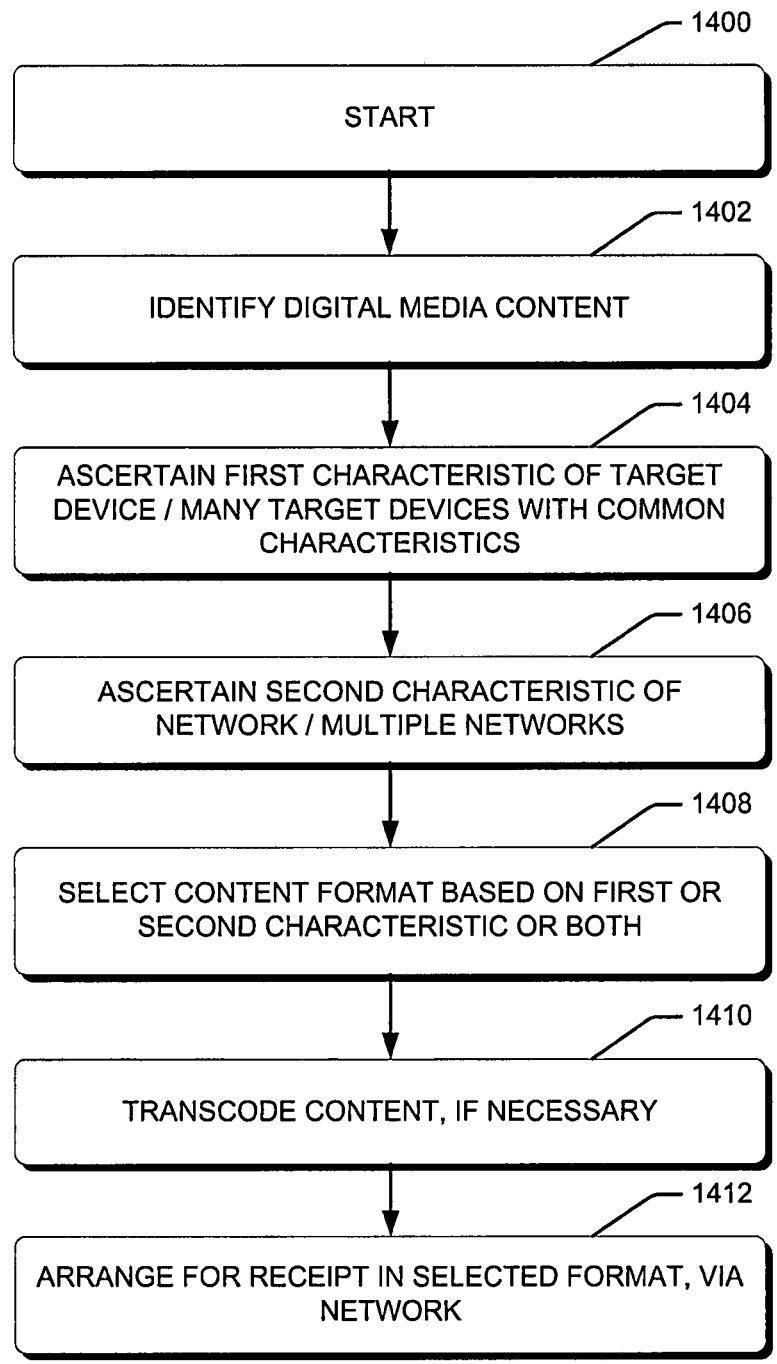
FIG. 14 is a flow diagram illustrating certain aspects of a method performed by aspects of the digital media content transcoding and system shown in FIG. 2.

With continuing reference to FIGS. 1-13, FIG. 14 is a flowchart illustrating certain aspects of a method for transcoding and distributing digital media content. The method illustrated in FIG. 14 may be implemented using computer-executable instructions executed by one or more general, multi-purpose, or single-purpose processors. FIG. 14 illustrates both network-side acts and client-side acts for discussion purposes. Unless specifically stated, the methods described herein are not constrained to a particular order or sequence. In addition, some of the described method or elements thereof can occur or be performed concurrently.

It will also be understood that all of the described steps need not occur. Likewise, certain steps may be repeated multiple times.

It is assumed that target device 104 is configured to receive digital data via one or more communication networks 110. It will be appreciated that, in general, a particular device may have a unique address associated with each network.

The method begins at block 1400 and continues at block 1402, where specific digital media content for distribution is identified. In the context of DMC TDS 101, digital media content 212 is ingested from, or identified on, a variety of user-controlled and non-user-controlled sources 114, 116, and 118, and selected by user 111 of target device 104.

In one scenario, detection and sync module 206 may include pluggable protocol adapters/interfaces that are configured to communicate with different sources 114, 116, 118 using appropriate communication protocols or techniques 109 to retrieve (for example, subscribe to) all or specific subsets of digital media content 212 particular sources on a periodic basis.

Generally, transcode manager 216 is responsible for using subset creation criteria 221 to create subsets of transcoded media content 214 from digital media content 212, and to store the transcoded media content 214 on one or more network-accessible information repositories. Subsets may be pre-established or established based on user input. For example, subsets of transcoded digital media content 214 that meet certain subset selection criteria 221 may be pre-established and periodically updated using the techniques discussed herein, or custom subsets may be established in response to user input. The subsets may be permanently or temporarily stored in one or more information repositories 211 (for example transcode cache 220).

User 111 of target device 104 identifies specific digital media content (for example, subsets (or references thereto) of transcoded media content 214) via user interfaces 101 and/or detection and sync module 206, which generally provide a digital media content discovery and access model that can be implemented in a client-side or network-side operating environment.

At block 1404, a characteristic of target device 104 (or many target devices with common characteristics) is ascertained. Examples of target device characteristics include but are not limited to: device type, processing capability, identification number(s), display capabilities, network connectivity capabilities, destination address information, and available memory. Such characteristics may be ascertained on-the-fly or pre-ascertained, and may be ascertained automatically by aspects of DMC TDS 101 or supplied manually by user 111.

At block 1406, a network characteristic associated with a network (or multiple networks) via which target device(s) 104 can communicate is ascertained. Examples of network selection criteria include but are not limited to network availability, network streaming capability, network reliability, user network preferences, network latency, network bandwidth, network usage level, and network usage cost.

At block 1408, based on the ascertained network or user/device characteristic(s) or both, a transcode format for the specific digital media content is selected. For example, if it is known that target device can access more than one network, the format for the transcoded digital media content may be selected based on the capabilities of the most desirable network (based on criteria such as user preferences, cost, etc.). The user may prefer to use an inexpensive high-speed network such as a WiFi connection to the Internet to obtain content, instead of a data network provided by a cellular operator. Alternatively, the user may desire to receive certain content in a streaming fashion, and the format of the transcoded digital media content selected based on the bandwidth supported by the network.

The step of arranging for transcoding the specific digital media content into the selected format (if necessary) is illustrated at block 1410. It will be appreciated that specific digital media content may be pre-transcoded into multiple formats and cataloged, or may be transcoded in response to the identification of particular user/device or network characteristics. In addition, it will be appreciated that the identification of particular user/device or network characteristics may occur in real-time, such as in response to user queries, or may be based on previously submitted user requests.

At block 1412, after the specific digital media content has been transcoded into the selected format, it is arranged for the target device to receive the transcoded content via the network. Generally, a communication session 109 is established between the target device and a network node (which may or may not be the network node that stores the transcoded digital media content), and the transcoded digital media content is distributed via the communication session. In the context of DMC TDS 101, communication manager 207/communication interfaces 205 is/are responsible for distributing (via streaming or downloading) the transcoded digital media content in accordance with aspects of the data communication protocol associated with communication session 109. Communication session 109 may be a peer-to-peer communication session or a client-server communication session.

In the case where digital media content 212 is protected by one or more enforceable intellectual property rights of one or more third parties, such as copyrights, patent rights, trademark rights, or trade secret rights, DRM engine 203 may be used to transfer items such as digital licenses that grant certain rights to client-side and/or network-side entities to use, reproduce, make derivative works of (for example, transcode) or distribute particular digital media content. Distribution of digital license(s) may occur before or after transcoding of, or during distribution of transcoded digital media content. DRM engine 203 may also enable the creation and distribution of new or derivative digital licenses, which may convey more, fewer, or different rights based on who is receiving the transcoded digital media content or where it is being distributed, for example.

In some cases anonymous access to DMC TDS 101 may be supported, although it is generally desirable for target device 104 to present a particular identity (associated with user 111 or target device 104) to gain access to transcoded digital media content. Transcoding may be based partially or solely on identity. For example, user 111 may be prompted to select a digital identity from among a number of possible identities via user interface 101. Alternatively, target device 104 may automatically select from among a number of possible digital identities. One or more claims, which may be self-issued and/or verifiable via network-side DMC TDS 101, source device 102, and/or or a third-party verification service, are generally made regarding items of information associated with each presentable identity (together items of information and claims are referred to as "credentials"). Examples of credentials associated with identities include but are not limited to SIM card information, email information, payment instrument information, phone number information, affiliation information, and name information. Any desirable now known or later developed authentication and authorization scheme or technology may be used to establish a level of trust and/or to verify the identity/claims presented by user 111/ target device 104. Examples of authentication and authorization schemes include but are not limited to user name and password schemes, Kerberos technologies, Microsoft® CardSpace™ technologies, proprietary authentication mechanisms, and other known or later developed implementations.

In this manner, the use of digital rights and identity management techniques in combination with the media content transcoding and distribution techniques described herein can accommodate a wide variety of business models that simultaneously support the often diverse interests of digital media content sources such as individuals, advertisers, media content creators and suppliers, network operators, and licensors/licensees. The varying rendering and network access capabilities of target devices are considered and digital media content from virtually any source is accessible from virtually anywhere.

Various aspects of systems, methods, and apparatuses for transcoding and distributing digital media content have been described. Although the subject matter herein has been described in language specific to structural features and/or methodological acts, it is also to be understood that the subject matter defined in the appended claims is not necessarily limited to the specific features or acts described above. Rather, the specific features and acts described above are disclosed as exemplary forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A computer-readable storage device encoded with computer-executable instructions which, when executed by a processor, perform a method for distributing transcoded digital media content to a personal electronic device of a user configured for communication via a network, the method comprising:
    arranging digital media content items into a plurality of subsets of digital media content items based on subset creation criteria;
    transcoding the subsets of the digital media content items based on the subset creation criteria;
    receiving a selection of an identity;
    identifying a specific digital media content item for distribution based on the identity;
    ascertaining a first characteristic associated with the personal electronic device;
    ascertaining a second characteristic associated with the communication network;
    ascertaining a plurality of first user preferences, wherein the plurality of first user preferences are associated with the personal electronic device and the communication network;
    selecting a format for the specific digital media content item based on the first characteristic, the second characteristic, and the plurality of first user preferences;
    transcoding the specific digital media content item into the selected format; and
    distributing the transcoded specific digital media content item to the personal electronic device via the network.

2. The computer-readable storage device according to claim 1, wherein the specific digital media content item is stored on a computer-readable medium associated with an electronic device controlled by the user.

3. The computer-readable storage device according to claim 1, wherein the specific digital media content item is stored on a computer-readable medium associated with an electronic device controlled by an entity other than the user.

4. The computer-readable storage device according to claim 1, wherein identifying the specific digital media content item comprises identifying a computer-readable medium storing the specific digital media content item, a location of the computer-readable medium selected from the group consisting of: another personal electronic device; and a network location.

5. The computer-readable storage device according to claim 1, wherein the specific digital media content item is selected from the group consisting of: one or more digital media objects; metadata associated with one or more digital media objects; one or more digital advertisements; metadata associated with one or more digital advertisements; and one or more digital licenses.

6. The computer-readable storage device according to claim 1, wherein
    the personal electronic device is selected from the group consisting of: a portable media rendering device; a personal computer; a phone; a camera; an in-vehicle media rendering device; and a personal digital assistant, and wherein
    the first characteristic is selected from the group consisting of: a device type; a processing capability; a destination address; an identification number; a network connectivity capability; a display capability; and an available memory.

7. The computer-readable storage device according to claim 1, wherein
    the network is selected from the group consisting of: the Internet; a managed wide-area network; and a private carrier network, and wherein
    the second characteristic is selected from the group consisting of: network availability; network streaming capability; network reliability; network latency; network bandwidth; network usage level; and network usage cost.

8. The computer-readable storage device according to claim 1, wherein the selecting the format for the specific digital media content item is further based on a second user preference associated with the communication network.

9. The computer-readable storage device according to claim 1, wherein the digital media content items are collected from a plurality of sources of digital media content, and each of the subsets of digital media content items comprises one or more of the digital media content items, the method further comprising:

storing the subsets of digital media content items in at least one temporary or persistent computer-readable storage device.

10. The computer-readable storage device according to claim 9, wherein the specific digital media content item is protected by a predetermined intellectual property right, and wherein the method further comprises:
   prior to distributing the transcoded specific digital media content item to the personal electronic device, arranging for distribution of a digital license granting a right under the predetermined intellectual property right,
   the right being granted to the user or to an entity authorized to distribute the specific digital media content item to the user, and the right being selected from the group consisting of: the right to render the specific digital media content item; the right to prepare derivative works of the specific digital media content item; the right to reproduce the specific digital media content item; and the right to distribute the specific digital media content item.

11. The computer-readable storage device according to claim 9, wherein distributing the transcoded specific digital media content item to the personal electronic device comprises:
   establishing either a peer-to-peer communication session or a client-server communication session with the personal electronic device via the network, and
   arranging for streaming or downloading the specific digital media content item via the established communication session.

12. The computer-readable storage device according to claim 9, wherein distributing the transcoded specific digital media content item to the personal electronic device comprises:
   ascertaining a group destination address with which the personal electronic device is associated, and
   transmitting the specific digital media content item to the group destination address.

13. The computer-readable storage device according to claim 1, wherein the method further comprises:
   basing one or more of the steps of ascertaining a first characteristic of the personal electronic device and selecting a format for the specific digital media content item on the identity.

14. The computer-readable storage device according to claim 1, wherein the computer-executable instructions are executable by a client-side processor.

15. The computer-readable storage device according to claim 1, wherein the computer-executable instructions are executable by a network-side processor.

16. The computer-readable storage device according to claim 1, wherein the computer-executable instructions are further executable by the processor to base one or more of the steps of ascertaining a first characteristic associated with the first personal electronic device and selecting a format for the first digital media content on the identity.

17. The computer-readable storage device according to claim 1, wherein the network is a wide area network (WAN) and the second characteristic includes network usage cost.

18. An apparatus for transcoding and distributing digital media content to personal electronic devices, comprising:
   a communication interface;
   a computer-readable storage device; and
   a processor responsive to the computer-readable storage device, to the communication interface, and to computer-executable instructions, the computer-executable instructions executable by the processor to:
   receive a selection of an identity;
   identify a first digital media content item for distribution based on the identity;
   ascertain a first characteristic associated with a first personal electronic device configured for communication via a network;
   ascertain a second characteristic associated with the network;
   select a format for the first digital media content item based on the first characteristic and the second characteristic;
   begin transcoding the first digital media content item into the selected format;
   receive a request from a second device for a second digital media content item associated with a higher priority than the first digital media content item;
   interrupt the transcoding of the first digital media content item in response to receiving the request from the second device for the second digital media content item;
   transcode the second digital media content item;
   resume the transcoding of the first digital media content item into the selected format in response to completion of the transcoding of the second digital media content item; and
   distribute, via the network, the first digital media content item to the first personal electronic device after the first digital media content item has been transcoded into the selected format.

19. The apparatus according to claim 18, wherein the apparatus comprises a personal electronic device.

20. The apparatus according to claim 18, wherein the apparatus comprises a server within a wide-area network, the wide-area network the same as, or different than, the network.

21. The apparatus according to claim 18, wherein the network is a wide area network (WAN) and the second characteristic includes network usage cost.

22. An apparatus, comprising:
   a communication interface;
   a computer-readable storage device; and
   a processor responsive to the computer-readable storage device, to the communication interface, and to computer-executable instructions, the computer-executable instructions executable by the processor to:
   receive a plurality of selections of a plurality of different identities;
   identify specific digital media content items for distribution to each of a plurality of personal electronic devices based on the received identities;
   ascertain a first characteristic associated with each of the personal electronic devices configured for communication via a network;
   ascertain a second characteristic associated with the network;
   select a format for each of the specific digital media content items to be distributed to each of the personal electronic devices based on the first characteristic associated with each respective personal electronic device and the second characteristic associated with the network;
   change an order of transcode priority for the specific digital media content items to a new order of transcode priority in response to receiving requests from a number of devices for a particular one of the specific digital media content items;
   transcode the specific digital media content items into the respectively selected formats according to the new order of transcode priority, wherein the specific digital media content items are arranged to be respectively received by each personal electronic device in the respectively selected formats via the network.

* * * * *